US006618628B1

(12) United States Patent
Davlin et al.

(10) Patent No.: US 6,618,628 B1
(45) Date of Patent: Sep. 9, 2003

(54) DISTRIBUTED INPUT/OUTPUT CONTROL SYSTEMS AND METHODS

(75) Inventors: Karl A. Davlin, 2811 Spruce Ridge Ct., St. Charles, MO (US) 63303; Adel George Tannous, 2061 Bohannon Dr., Santa Clara, CA (US) 95050; Alan R. Loudermilk, 1550 N. Lake Shore Dr., Suite 16C, Chicago, IL (US) 60610

(73) Assignees: Karl A. Davlin, St. Charles, MO (US); Adel George Tannous, Santa Clara, CA (US); Alan R. Loudermilk, Chicago, IL (US)

( * ) Notice: Subject to any disclaimer, the term of this patent is extended or adjusted under 35 U.S.C. 154(b) by 0 days.

(21) Appl. No.: 09/680,865

(22) Filed: Oct. 5, 2000

(51) Int. Cl.$^7$ .............................................. G05B 19/18
(52) U.S. Cl. .............................. 700/3; 700/20; 709/208
(58) Field of Search ......................... 700/3, 9, 19, 20; 709/208; 340/2.1, 2.26, 3.1, 825.22, 825.23; 710/110; 712/31

(56) References Cited

U.S. PATENT DOCUMENTS

| | | | |
|---|---|---|---|
| 3,636,331 A | 1/1972 | Amrehn | 235/151.12 |
| 3,829,842 A | 8/1974 | Langdon et al. | 340/172.5 |
| 3,924,240 A | 12/1975 | Given | 340/172.5 |
| 4,005,387 A | 1/1977 | Herring et al. | 340/172.5 |
| 4,215,398 A | 7/1980 | Burkett et al. | 364/101 |
| 4,799,140 A | 1/1989 | Dietz et al. | 364/140 |
| 5,796,920 A | 8/1998 | Hyland | 395/22 |

OTHER PUBLICATIONS

Analog Devices, Inc. data sheet, LC$^2$MOS 5 Ω RON SPST Switches, ADG51/ADG452/ADG453, Rev. A, pp. 1–11, 1998.

Analog Devices, Inc. data sheet, "Serial Input 16–Bit 4 mA–20 mA, 0 mA–20mA DAC, AD420", Rev. F, pp. 1–10.
Microchip Technology, Inc. data sheet, "MCP2510, Stand–Alone CAN Controller with SPI™ Interface," DS21291B, pp. 1–10, 1999.
Microchip Technology, Inc. data sheet, "PIC17C7XX, High– Performance 8–Bit CMOS EPROM Microcontrollers with 10–bit A/D," DS30289A, pp. 1–3, 1998.

*Primary Examiner*—Paul P. Gordon
(74) *Attorney, Agent, or Firm*—Loudermilk & Associates

(57) ABSTRACT

Apparatus and methods for controlling a system that operates responsive to a plurality of input control signals are disclosed. During operation the system generates a plurality of output status/control signals. A master controller has at least first and second controllers. The first controller outputs and inputs signals over a first communication path, and the second controller outputs and inputs signals over a second communication path. The first and second controllers output signals based on input signals received over the first and second communication paths, respectively, and also based on stored control data. A plurality of input/output modules are provided. Each of the input/output modules has first and second slave controllers. The first slave controller of each of the input/output modules inputs and outputs signals over the first communication path to the first controller, and the second slave controller outputs and inputs signals over the second communication path. Each of the first slave controllers outputs and inputs signals to and from a first input/output circuit, and each of the second slave controllers outputs and inputs signals to and from a second input/output circuit. Each of the input/output modules also includes a combiner circuit. At least some of the input control signals for controlling the system are generated by the combiner circuit of each input/output module based on signals output from both the first and second input/output circuits. The output control signals for controlling the system are generated based on output status/control signals from the system that are coupled to each of the first and second input/output circuits of the input/output modules.

20 Claims, 10 Drawing Sheets

Internal Diagram

Internal Setup on Main Interlock Controller Module

DISTRIBUTED INPUT/OUTPUT CONTROL SYSTEMS AND METHODS

FIELD OF THE INVENTION

The present invention relates to systems and methods utilizing inputs and outputs for purposes of controlling equipment (e.g., semiconductor process equipment), industrial machinery, processing lines and the like, and more particularly to input and output control systems and methods utilizing distributed input/output modules and integral interlocks.

BACKGROUND OF THE INVENTION

A variety of control systems for equipment, processing lines, assembly lines and the like have been proposed and utilized to varying degrees. For example, systems based on the use of digital computers and/or microprocessors/microcontrollers are known to provide a reasonably high degree of programmable input/output control for such applications. While the advances in this general field have been relatively great, due to reasons such as safety and conventional design practices, there are a number of undesirable attributes of such conventional control systems.

FIG. 1 illustrates an exemplary control system such as might be found in a piece of processing equipment, such as for fabricating semiconductors. Controller 10 serves to provide control to the equipment by way of interface 16 (which may be a series of wires, etc.) coupled to control terminals of relays distributed through the equipment, and may also receive inputs from sensors in the equipment. Signals to and from the relays and sensors are coupled to controller 10, thereby providing a highly centralized control system for the equipment. In certain of such systems, the connections to the relays and/or sensors are made by way of what are frequently referred to as VME cards 14, which may be added to controller 10 in the desired number and type in order to satisfy the input/output control requirements for the equipment. Controller 10 may be coupled to another computer via interface 12. The inputs and outputs from controller 10 may, in general, be either inputs or outputs, digital or analog, etc.

Such conventional systems, while providing a highly centralized form of control, suffer from various disadvantages. For example, the numerous wires that must pass from cards 14 to the various relays often result in large, bulky and complex wiring harnesses. Bulky and/or complex wiring harnesses, for example, increase manufacturing costs, make changes in the system more difficult, and can result in undesirable compromises in the overall system physical design in order to accommodate the wiring harnesses. In addition, it is often more difficult to implement redundancy with such a centralized control system, and the problems associated with maintenance and/or upgrades to the equipment tend to be complex and difficult.

SUMMARY OF THE INVENTION

The present invention is directed to improved control systems and methods utilizing inputs and outputs for purposes of controlling equipment (e.g., semiconductor process equipment), industrial machinery, processing lines, assembly lines and the like, and more particularly to input and output control systems and methods utilizing distributed input/output modules and integral interlocks. In preferred embodiments, a main controller module is provided, which desirably may be coupled to a host computer for controlling the equipment, processing line, assembly line, other environment, etc. The main controller includes a communications interface, such as for communicating with the host computer (or other interface for input and output of control commands, status or control information, etc.), and also includes at least first and second interlock controllers. The first and second interlock controllers communicate to a plurality of input/output (I/O) modules that are distributed in appropriate and desired locations in the equipment, line, environment, etc.

In preferred embodiments, each I/O module includes at least first and second slave controllers that communicate, respectively, with the first and second interlock controllers of the main controller, preferably over first and second communication paths. Each of the first and second slave controllers are coupled to a set of I/O drivers (and associated circuitry). In each I/O module, the inputs/outputs from each of the I/O drivers are logically combined, such as with an AND or other logical or other operation, to provide I/Os to the equipment, line, environment, etc. Preferably, each I/O module may be of a standard or identical design (preferably with a unique address or identifier), with each of the various inputs and outputs being programmable or configurable as inputs, outputs, analog, digital, etc.

In accordance with the present invention, a large number of inputs and outputs may be provided in the equipment, line or environment, with distributed I/O modules communicating with the main controller over a suitable bus, as opposed to a bulky wiring harness, etc. Redundant controllers in the main controller and the I/O modules, in accordance with preferred embodiments of the present invention, provide redundant, programmable, interlock control for the equipment, line or environment, etc. Standard-type I/O modules enable technicians to more readily repair and upgrade the equipment and the like.

Accordingly, it is an object of the present invention to provide distributed redundant control systems and methods, which are particularly suited for equipment such as semiconductor or other processing/fabrication equipment, and also may be configured for processing lines, assembly lines, building control, etc.

It is another object of the present invention to provide such control systems and methods that utilize redundant interlock control.

Finally, it is an object of the present invention to provide such control systems and methods that utilize a main controller and distributed I/O modules having redundant processors in order to provide redundant interlock control in a distributed, programmable and highly cost effective manner.

BRIEF DESCRIPTION OF THE DRAWINGS

The present invention may be more fully understood by a description of certain preferred embodiments in conjunction with the attached drawings in which.

DETAILED DESCRIPTION OF THE PREFERRED EMBODIMENTS

The present invention will be described in greater detail with reference to certain preferred embodiments and certain other embodiments, which may serve to further the understanding of preferred embodiments of the present invention. As described elsewhere herein, various refinements and substitutions of the various embodiments are possible based on the principles and teachings herein.

Figure 1:
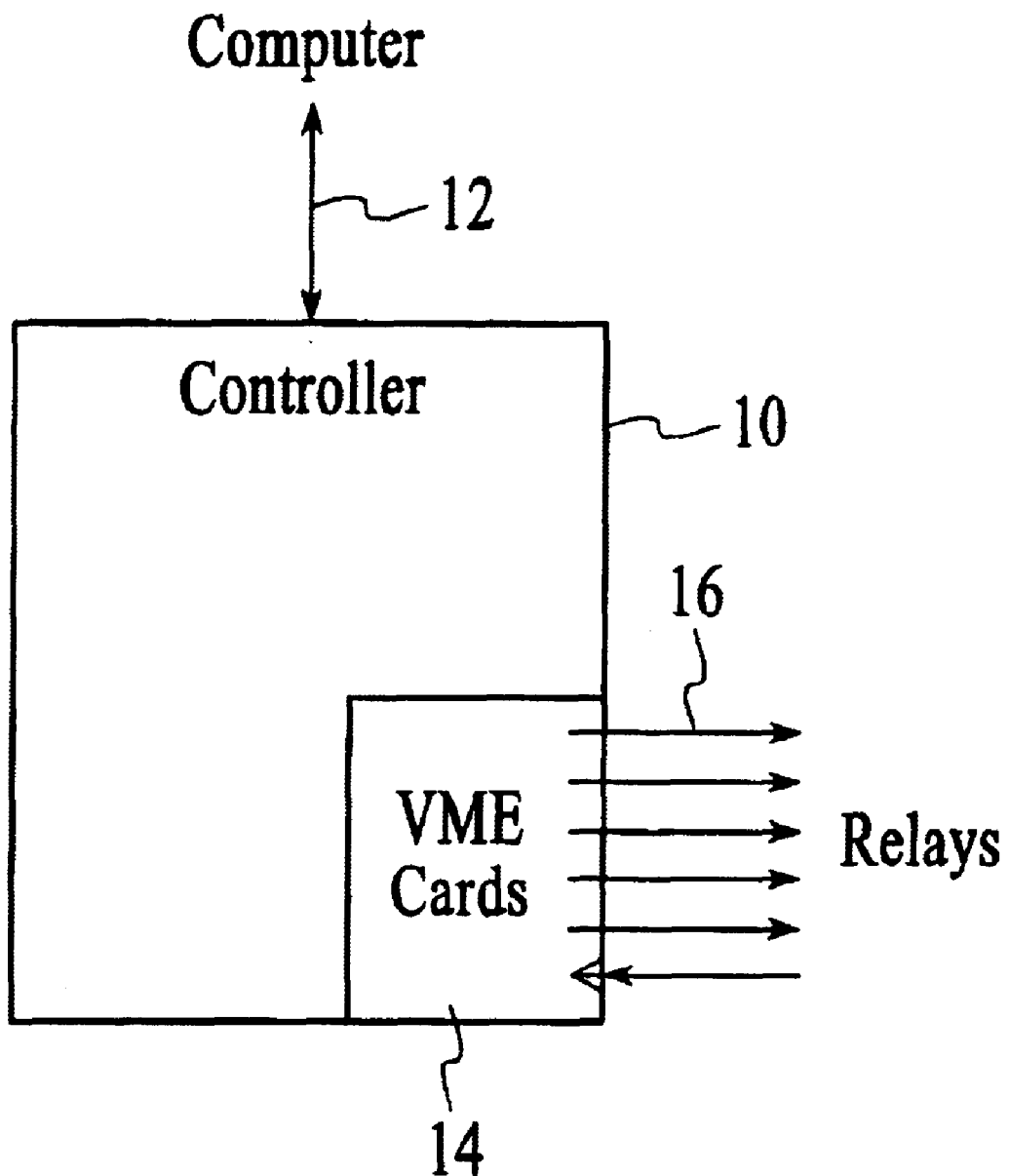
FIG. 1 is a diagram illustrating an exemplary conventional control system.
Figure 2:
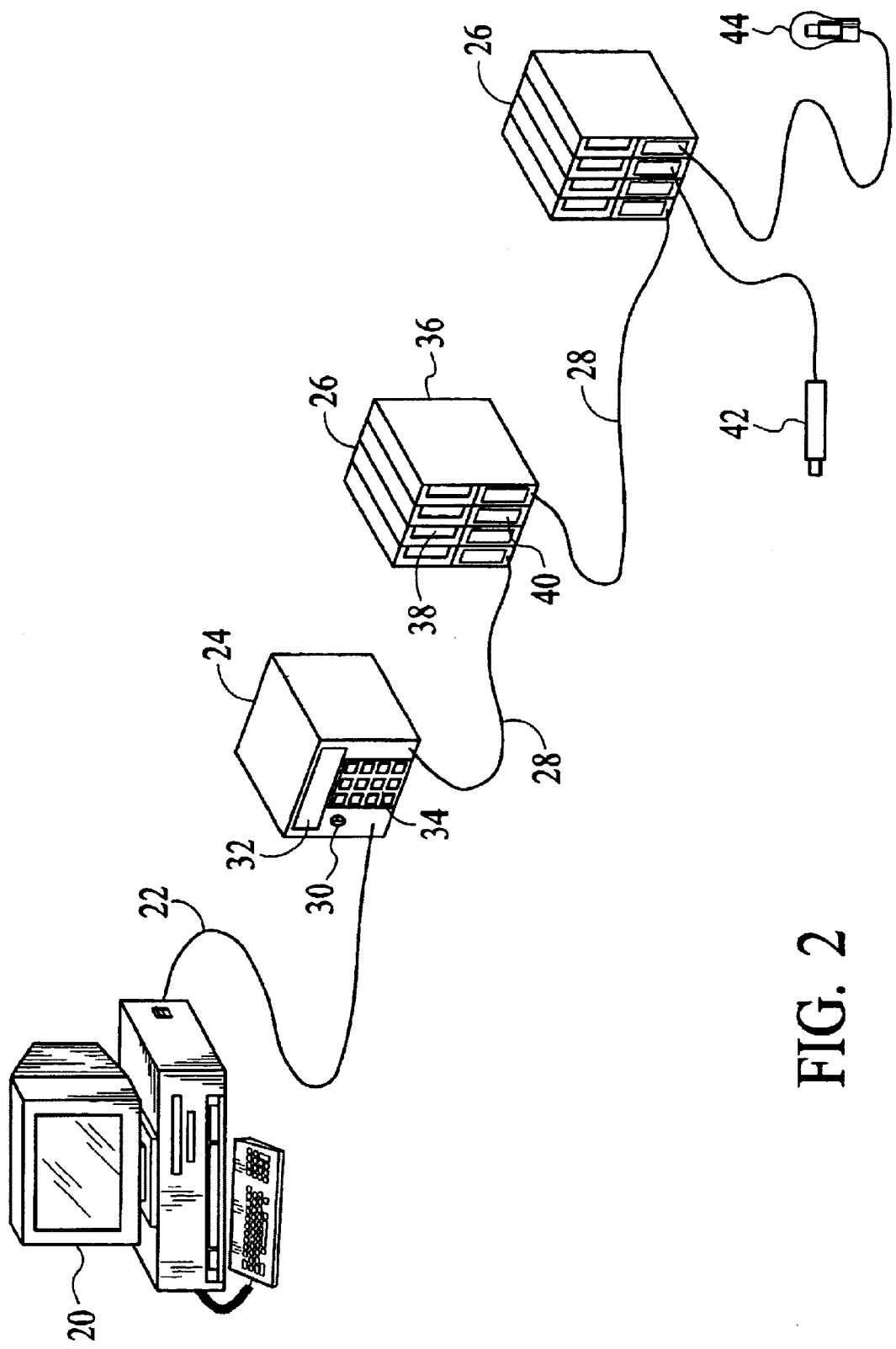
FIG. 2 is a diagram illustrating a preferred embodiment of the present invention.

With reference to FIG. 2, an exemplary preferred embodiment of the present invention will now be described. While one particularly advantageous application of the present invention is for processing equipment such as for fabricating semiconductors, LCDs or other displays, electronics, medical devices, optical devices and the like, which typically include various chambers, chamber doors, heaters, robotic motors and actuators, gas flows, mass flow controllers and meters, timed events and the like, and much of the following discussion will be understood for such applications, it should be understood that it the present invention is not intended to be limited to such applications.

FIG. 2 illustrates the major components of an exemplary preferred embodiment of the present invention. Main controller 24 is coupled to a plurality of I/O modules 26 via bus 28. Bus 28 preferably is a dual serial-type communication cable. In certain preferred embodiments, the communications over bus 28 are in accordance with what are known in the industry as the CAN or I²C serial communication protocols. Also in certain preferred embodiments, bus 28 is dual in the sense that independent communication channels for both A and B slave controllers of I/O modules 26 are provided (the present invention could be extended to more that two slave controllers, in particular could have a plurality (N, preferably an odd number such as three, five, etc.) of slave controllers and preferably communication channels and a majority vote combination operation such as described in U.S. Pat. No. 4,799,140, which is hereby incorporated by reference). In other embodiments, a single communication channel is provided from main controller 24 to I/O modules 26, and in such alternative embodiments main controller 24 can communicate with A and B slave controllers individually or as a group, such as with a suitable addressing convention for the slave controllers (i.e., addresses for individual slave controllers and/or addresses that are common to more than one slave controller, and which preferably also include an address that is common to all slave controllers in order to have a single command simultaneously or concurrently received by a plurality of slave controllers; e.g., each slave controller may respond to one or more "global" commands sent to one, two, three or more addresses). Addresses may be "hardwired", such as by dip or other switches, or each module may have a non-volatile memory or other storage that includes an address or identifier; the main controller may interrogate the I/O modules to learn the addresses, which may be implemented by way of the main controller operating in a special interrogation mode, with each I/O module providing its address or identifier in response to a manual button push (a button may be provided on the I/O module for such address identification purposes, etc.). Other addressing schemes may be utilized, as will be apparent from the foregoing, and such are also contemplated to be within the scope of the present invention. What is important is that each I/O module have an address or identifier so that communications may reliably occur between the I/O modules and the main controller.

As illustrated, I/O modules 26 desirably may include mounting 36, which may be what is known as DEN rail mounting, for easy installation and removal from the processing equipment or other environment. Such easy installation and removal of I/O modules facilitates maintenance (e.g., remove and replace a defective I/O module, etc.) and upgrade of equipment or processing lines, etc., incorporating such I/O modules. Each I/O module 26 desirably includes a plurality of inputs and outputs, and in one preferred embodiment includes 16 inputs/outputs per I/O module (in alternative embodiments, a different number of inputs/outputs are provided per I/O module, such as 10, 20, 32, etc.). In certain embodiments, at least certain of I/O modules 26 also include a PWM output such as for motor control or the like. Connector 40 may be provided in order to facilitate connection between the inputs/outputs (which may include a PWM output) of I/O module 26 and control points of the equipment or environment. I/O modules 26 are implemented so as to facilitate desirable connection between inputs/outputs of the I/O module and signal outputs or inputs of the equipment or environment. I/O modules 26 also may include LED indicators 38 (or other display), which preferably may be used to indicate I/O status for each input/output, and preferably also interlock status. The use of such indicators as LED indicators allows an operator or service technician or the like to discern the status of the inputs/outputs controlled by the I/O module, such as for monitoring, maintenance or diagnostic purposes. I/O modules 26 may receive inputs 42, such as from a pressure sensor, pressure switch, door switch, etc., and may provide outputs 44 such as to a light bulb, relay, mass flow controller, pneumatic valve, etc. Additional details of exemplary I/O modules 26 will be provided hereinafter.

Main controller 24 preferably includes LCD or other display 32 for displaying status, control or other information to an operator or service technician. Main controller 24 also preferably includes keypad, switch or other user input 34, such as for providing a direct user interface to main controller 24, which may be used to provide manual commands to main controller 24, enable programming or programming changes to main controller 24, etc. Key switch 30 may be provided, for example, to enable/disable or control interlock override operation, programming changes, command input, etc. Main controller 24 may communicate with host computer 20 over bus 22. Bus 22 may be, for example, implemented with one or a plurality of communication protocols, such as Firewire (IEEE 1394 or its variants), RS232, TCP/IP, USB, in a manner to facilitate desired communications between host computer 20 and main controller 24 (the specific communication protocols provided herein are believed to be particularly desirable or advantageous such as in the mentioned applications). It should be noted that, in certain embodiments, main controller 24 may be implemented with sufficient intelligence and user input/output so that a host or other computer is not required to control the equipment or environment. Alternatively, if a host or other computer also is provided, then the required overall functions for controlling the equipment or environment may be divided between main controller 24 and the host or other computer. Additional details of an exemplary main controller 24 will be provided hereinafter.

Figure 3:
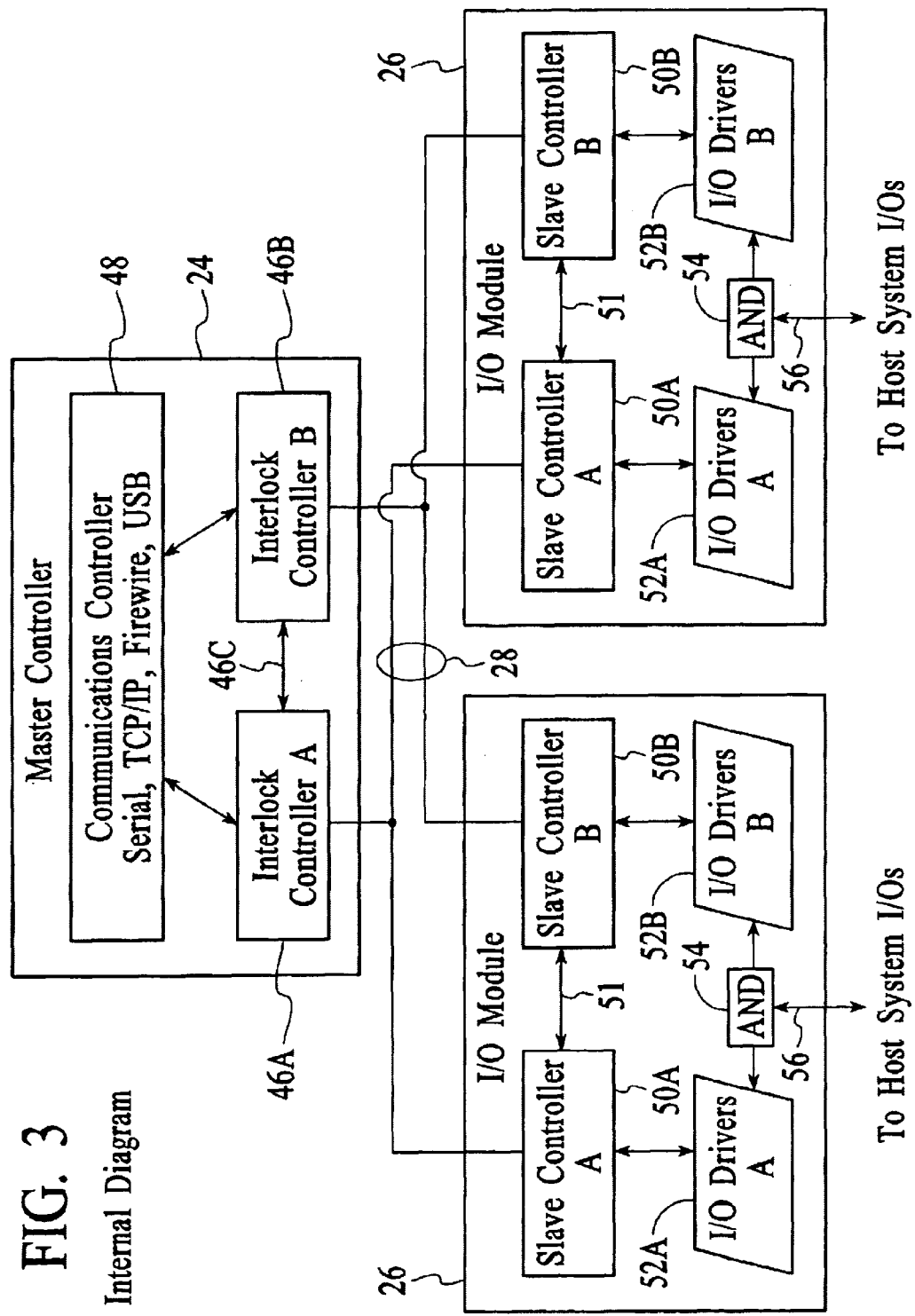
FIG. 3 is a block diagram illustrating a preferred embodiment of the present invention.

FIG. 3 illustrates in greater detail a master controller and I/O modules in accordance with exemplary preferred embodiments of the present invention. As illustrated, master controller 24 includes communications controller 48, to which is coupled is bus 22 for communication with a host or other computer (with embodiments that include a host computer, etc.). Commands and information may be coupled from communications controller 48 to interlock controller 46A and interlock controller 46B, which may in turn communicate commands and information to a plurality of slave controllers (50A and 50B) in a plurality of I/O modules 26 over bus 28. For discussion purposes, only two I/O modules 26 are shown, but the number of such I/O modules generally may be determined by the I/O needs of the target equipment, processing line or other environment. As explained earlier, bus 28 preferably is a dual-type serial communication bus in the preferred embodiments, but in other embodiments other communication protocols/types may be used. As illustrated in FIG. 3, interlock controllers 46A and 46B also may communicate with each other over bus 46C, such as for synchronization and status or redundancy checking purposes and the like.

Within an I/O module 26, slave controller 50A communicates with I/O drivers 52A, and slave controller 50B communicates with I/O drivers 52B as illustrated. For redundancy purposes, the outputs of I/O drivers 52A and 52B are combined with combiner circuit 54, which logically may be considered a logical AND operation in accordance with the preferred embodiment. Thus, an output signal may be provided if both slave controllers 50A and 50B are in agreement that the output signal should be provided, thus providing a measure of redundancy and safety greater than if an output (e.g., valve, gas flow, heat, etc.) is activated if only one of the two slave controllers indicate that the output should be provided. While combiner circuit is illustrated in the preferred embodiment as a logical AND operation, it should be noted that other combination circuits could be utilized (e.g., other logical combination circuits or a majority circuit could be utilized, such as described earlier for embodiments utilizing more than two slave controllers per I/O module, etc.; the alternative embodiment where N slave controllers per I/O module, where N preferably is three with a majority vote combination circuit is particularly noted). The present invention thus is not limited to logical AND operations, but may also include other logical operations, in particular OR or XOR, etc. It is believed, however, that a logical AND type operation in combiner circuit 54 provides outputs to I/O connections 56 in a desirable and reliable manner for the many applicable equipment, processing lines and other environment applications, etc. Also as illustrated in FIG. 3, slave controllers 50A and 50B also may communicate with each other over bus 51, such as for synchronization and status or redundancy checking purposes and the like. It should be noted that bus 51 is optional in that slave controllers 50A and 50B may also communicate with each other for such purposes via communication back to the corresponding interlock controller in the main controller (the corresponding interlock controller may communicate with each other through bus 46C, as previously described).

Figure 4:
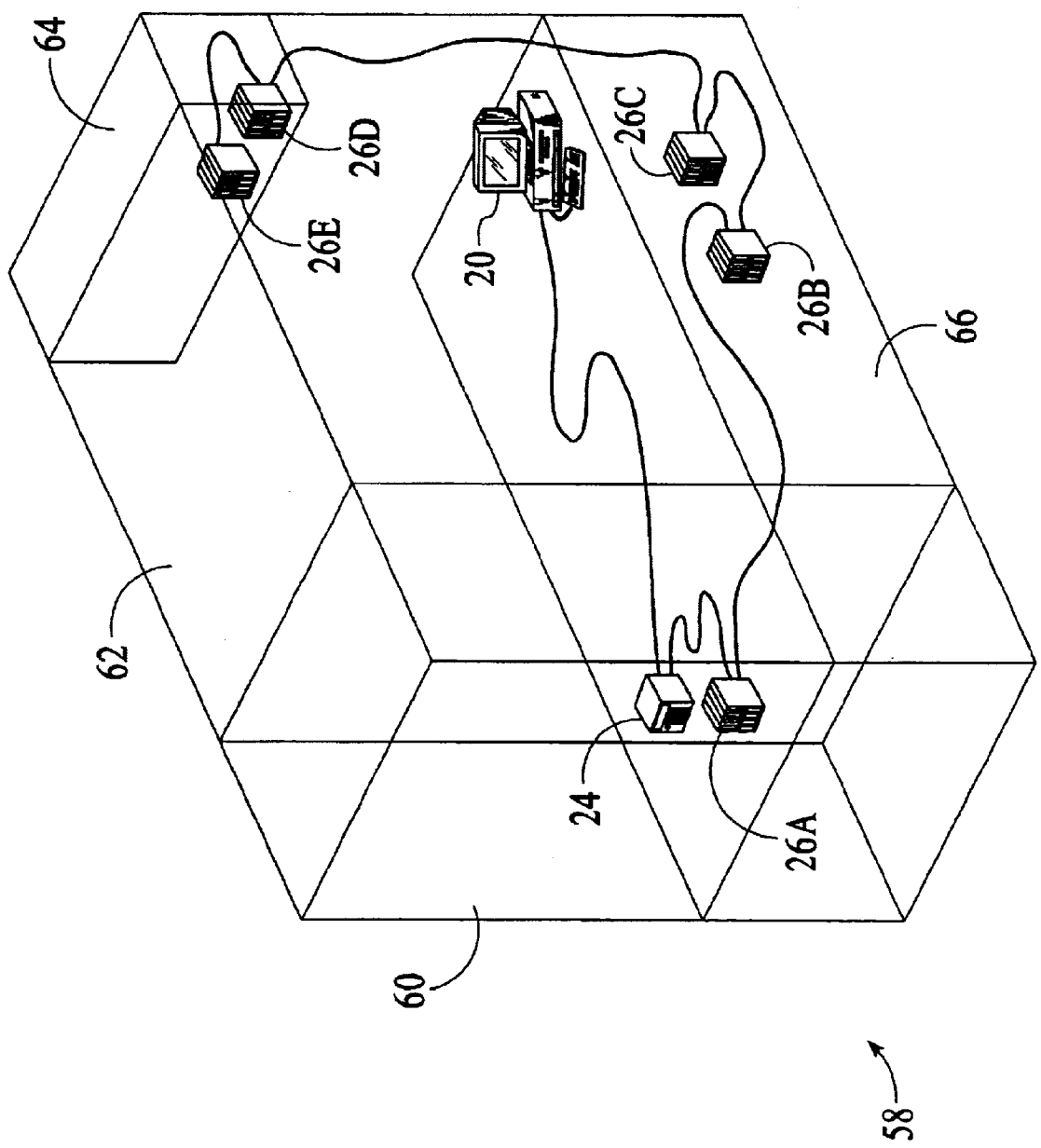
FIG. 4 is a diagram illustrating a preferred embodiment of a system incorporating a preferred control system/method in accordance with the present invention.

FIG. 4 illustrates an application of certain preferred embodiments of the present invention in an exemplary system 58, which preferably may be processing equipment such as for semiconductors or other devices or implements (as described elsewhere herein), and may include an ion implantation system, plasma or reactive ion or other etching system, plasma enhanced or high temperature or other chemical vapor deposition system, diffusion system, optical exposure system, etc. Such equipment typically includes one or more processing chambers 62, one or more robotic bays 60 such as for receiving or discharging from the equipment wafers or other items that are to be processed or have been processed, etc. AC box area 64 typically is provided to receive AC or other power and provide power to equipment 58. Lower box area 66 typically is provided for service and access to gas inputs and plumbing, such as for particular chemicals or materials used in the process performed by equipment 58. In the illustrated embodiment, main controller 24 is coupled to host computer 20, with main controller 24 positioned in a location physically remote from host computer 20 (in other embodiments, main controller 24 is located in close physical proximity to host computer 20). Host computer 20 and main controller 24 communicate as described elsewhere herein. I/O modules may be desirably positioned in a distributed manner around equipment 58, such as in proximity to AC box area 64, lower (gas) box area 66, robotic bay 60, etc., to facilitate placement of the desired number of I/O control points in the desired area. With such a distributed I/O system, the complexity of the system may increase (in particular such as a multi-processing chamber, serial plasma CVD system may be used for forming TFT LCDs having multiple different layers in a single system without breaking vacuum, etc.), while the bus wiring for the complex and number I/O control remains relatively uncomplex, etc. As a particular example, the present invention is particularly directed to complex processing equipment for LCDs and semiconductors, such as embodiments having a first chamber for depositing a first layer, which preferably may comprise oxide or nitride, a second chamber for depositing a second layer, which preferably may comprise oxide, nitride or a semiconductor layer that may be intrinsic, a third chamber for depositing a third layer, which may preferably be a doped semiconductor layer, etc., with these and perhaps other chambers controlled by one or more I/O modules (in a particular embodiment, each chamber is controlled by a corresponding I/O module). As illustrative examples, the first layer could be a nitride gate passivation layer for a gate electrode of an LCD thin film transistor, the second layer could be an undoped or intrinsic semiconductor layer such as amorphous silicon, and the third layer could be a doped semiconductor; other processing steps could be conventionally completed to form the LCD panel incorporating such thin film transistors (see, e.g., U.S. Pat. No. 4,624,737, which is hereby incorporated by reference), or the first layer could be an oxide passivation layer for a semiconductor integrated circuit, and the second layer could be a nitride passivation layer for the semiconductor integrated circuit, thereby forming a dual-type passivation in equipment controlled in accordance with the present invention. Thus, complex equipment for forming such devices may be implemented in accordance with the present invention in a more expedient and desired manner.

Main controller 24 communicates with a plurality of I/O modules 26 (I/O modules 26A–E shown in the illustrated embodiment) as described elsewhere herein. As illustrative examples in the illustrated equipment of FIG. 4, the inputs/outputs may be coupled (in the case of semiconductor processing equipment processing wafers which are input/output via a cassette) from: I/O module 26A to load window/port control(s) and sensor(s), cassette load/unload control(s) and sensor(s), SMIF parallel interface(s), light curtain sensor (s), fan filter control(s), fan filter pressure sensor(s), robotic bay door(s), and power supply voltage/current sensor(s); I/O module 26B to pressure sensor(s), flow meter(s), automatic pressure control(s), heater over-temperature monitor(s), chamber door switch(es), motor over-temperature sensor(s), relay(s), pneumatic control(s) (valve(s) and cylinder(s)), water flow sensor(s), elevator sensor(s), exhaust pressure sensor(s), and gas leak detector(s); I/O module 26C to setpoint/actual mass flow controller(s), pressure sensor(s), pressure controller(s), and liquid level sensor(s); I/O module 26D to contactor(s), relay(s), and rear light control(s); and I/O module 26E to heater lift sensor(s) and control(s), wafer vacuum sensor(s) and control(s), wafer pressure sensor(s) and control(s), chamber pressure sensor(s), and wafer present sensor(s). What is important to note is that, with the distributed I/O modules of the present invention, a large number of inputs and outputs to/from the system or environment to be controlled may be desirably provided in a distributed manner, with the I/O modules located in reasonable proximity to the corresponding sensors and control points of the system.

Figure 5:
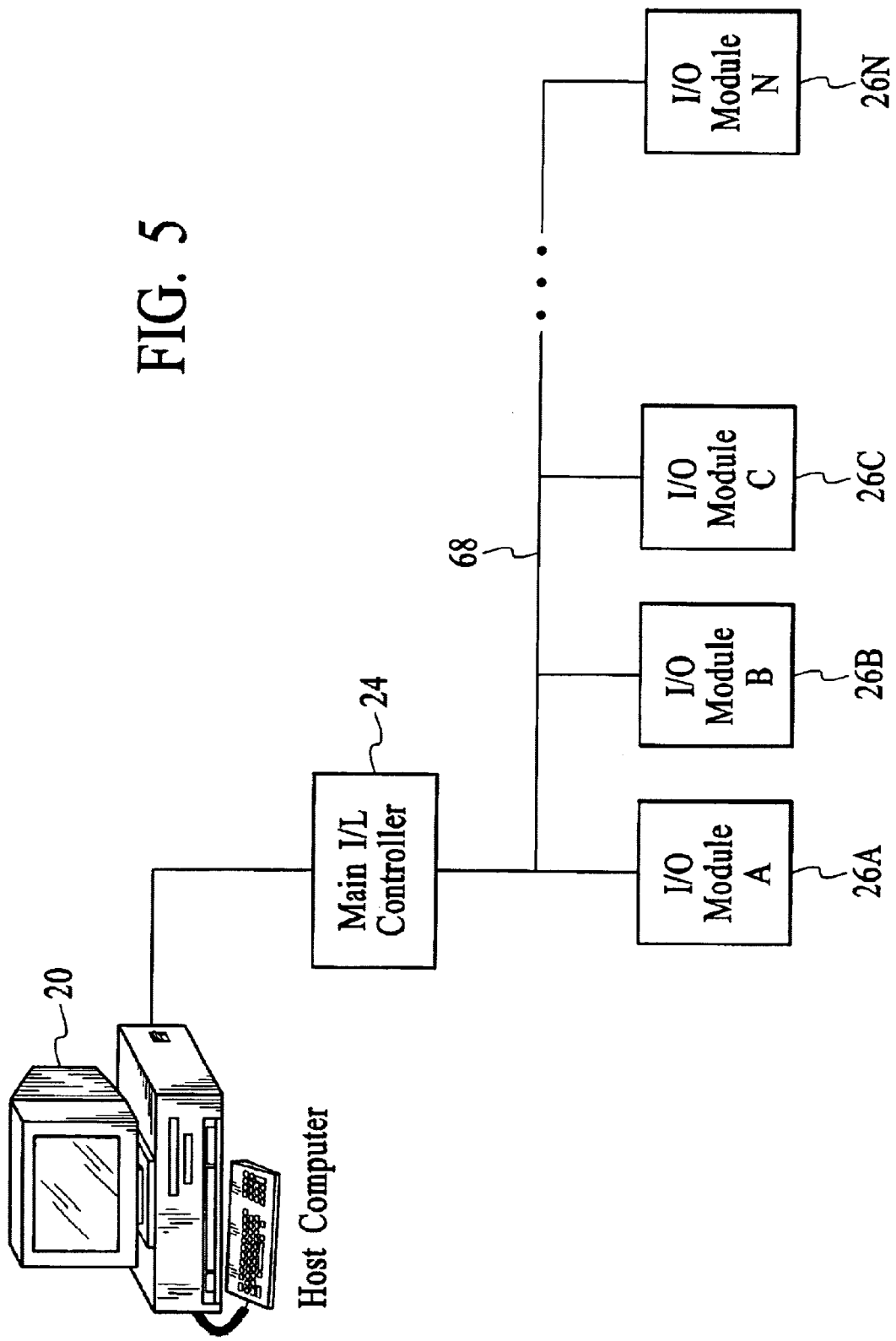
FIG. 5 is a diagram illustrating a preferred embodiment of a general line or environment incorporating a preferred control system/method in accordance with the present invention.

FIG. 5 illustrated a general operating environment, which may a manufacturing line, an industrial or food or other processing line, building (single or multiple buildings, etc.) or other environment in which a control system having multiple inputs and outputs in accordance with the present invention. In accordance with the illustrated embodiment, the environment generally illustrated by line 68 includes a number of spatially distributed control points, and at least certain of such control points include an I/O module (I/O modules 26A to 26N are illustrated). At each of the distributed control points of the environment being controlled, an I/O module 26 is provided. Accordingly, at each of the control points, a plurality of inputs and outputs for providing voltages or currents, or sensing voltages or currents, etc., may be provided. Thus, a distributed control system is desirably provided with I/O modules provided in a distributed manner in locations positioned correspondingly to control/sense points of the environment being controlled. As previously explained, I/O modules 26 are coupled to main controller 24, which preferably (but optionally) is coupled to host computer 20. As will be understood, various industrial processes may be implemented in accordance with the embodiment of FIG. 5, such as performing a first processing step at a first station, a second processing step at a second station, so on for a plurality (N) of processing steps/stations, with the output being a finished or semifinished industrial article, or sorted, cleaned and labeled industrial or food products, etc.

Figure 6:
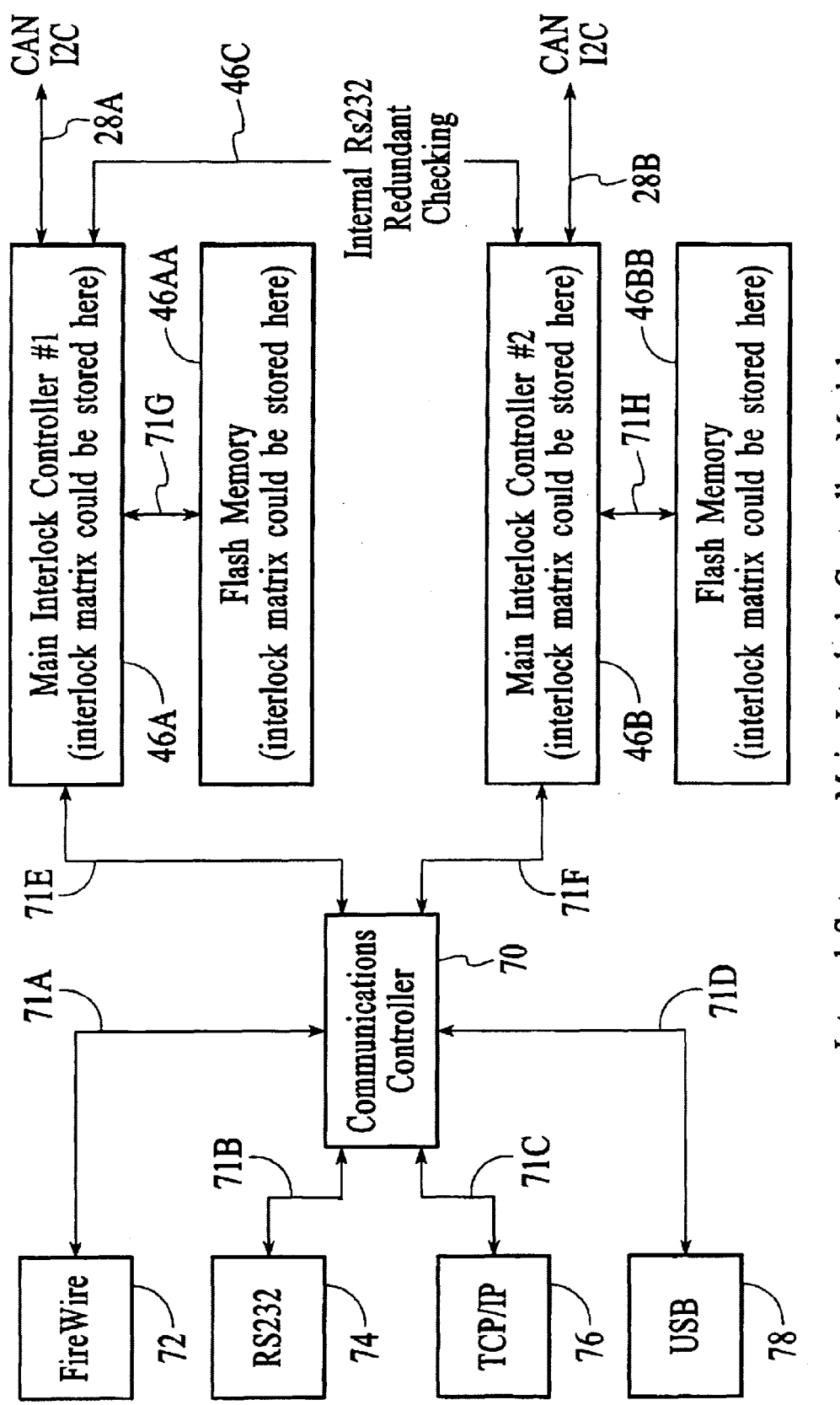
FIG. 6 is a diagram illustrating an exemplary preferred embodiment of a main controller in accordance with the present invention.

FIG. 6 illustrates in greater detail exemplary components of a main controller module 24 in accordance with preferred embodiments of the present invention. As explained in greater detail elsewhere herein, main controller 24 may desirably provide interlock control to the equipment or other environment being controlled via signals coupled to/from preferably distributed I/O modules 26.

As illustrated, main controller preferably includes one or a plurality of communication interfaces under control of communications controller 70, with the illustrated interfaces including a FireWire interface 72 (communicating with communications controller 70 over bus 71 A), an RS232 interface 74 (communicating with communications controller 70 over bus 71 B), a TCP/IP interface 76 (communicating with communications controller 70 over bus 71C), and/or a USB interface 78 (communicating with communications controller 70 over bus 71D) (elements 70–78 generally may be considered to correspond to block 48 of FIG. 3, etc., although it should be understood that preferred embodiments may not necessarily include all of the illustrated communication interfaces). In preferred embodiments a plurality of communication options are provided in main controller 24, thereby enabling a single version of main controller 24 to communicate over a variety of interface types, thereby enabling main controller 24 to be useable in a variety of operating environments without having a single specific communication interface. In other embodiments, a single communication interface is chosen. What is important is that communications controller 70 have one or a plurality of suitable interfaces so that main controller 24 may be coupled to, and communicate with, a host computer (in embodiments including one or more host computers, etc.).

Communications controller 24 communicates with interlock controllers 46A and 46B over buses 71E and 71F, respectively. In certain preferred embodiments, each of controllers 46A and 46B are coupled to Flash memories 46AA and 46BB over buses 71G and 71H, respectively (in other embodiments, other (preferably non-volatile) memory is utilized). Alternatively, controllers 46A and 46B may be implemented with a processor that includes on-board Flash or other (preferably) non-volatile memory. Such memories may desirably contain, in addition to operating software, interlock and/or other control matrices, tables, etc., in order for the control system to implement the desired control algorithm and control functionality. Controllers 46A and 46B preferably communicate with each other, such as for redundancy checking purposes and the like, over bus/connection 46C. Controller 46A communicates with the slave controllers 50A of I/O modules 26, and controller 46B communicates with the slave controllers 50B of I/O modules 26, via a preferably serial bus 28A and 28B, respectively, which in preferred embodiments is in accordance with the CAN or I$^2$C protocols.

Figure 7A:
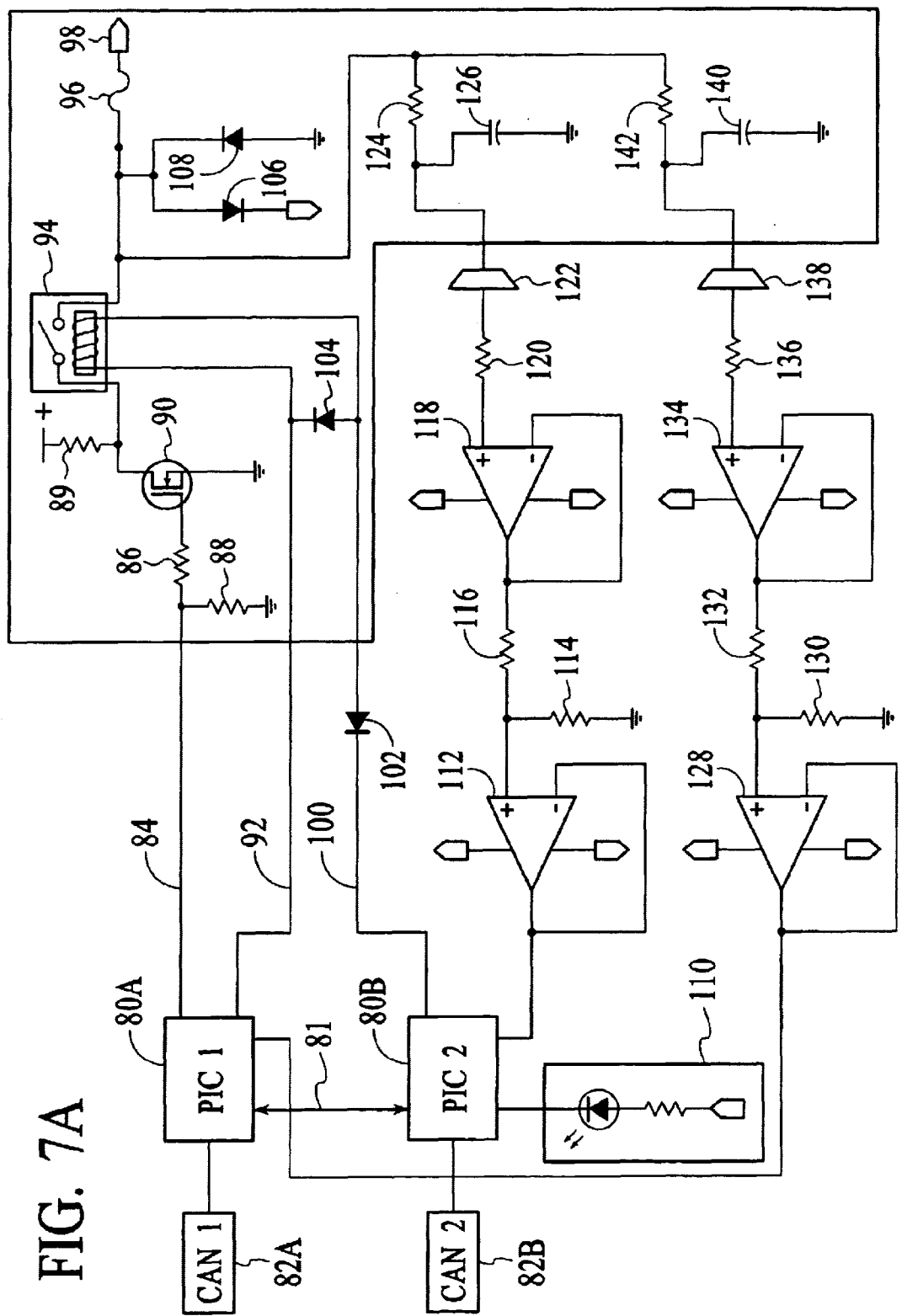
FIGS. 7A to 7C are diagrams illustrating an exemplary preferred embodiment of an input/output module in accordance with the present invention.
Figure 7B:
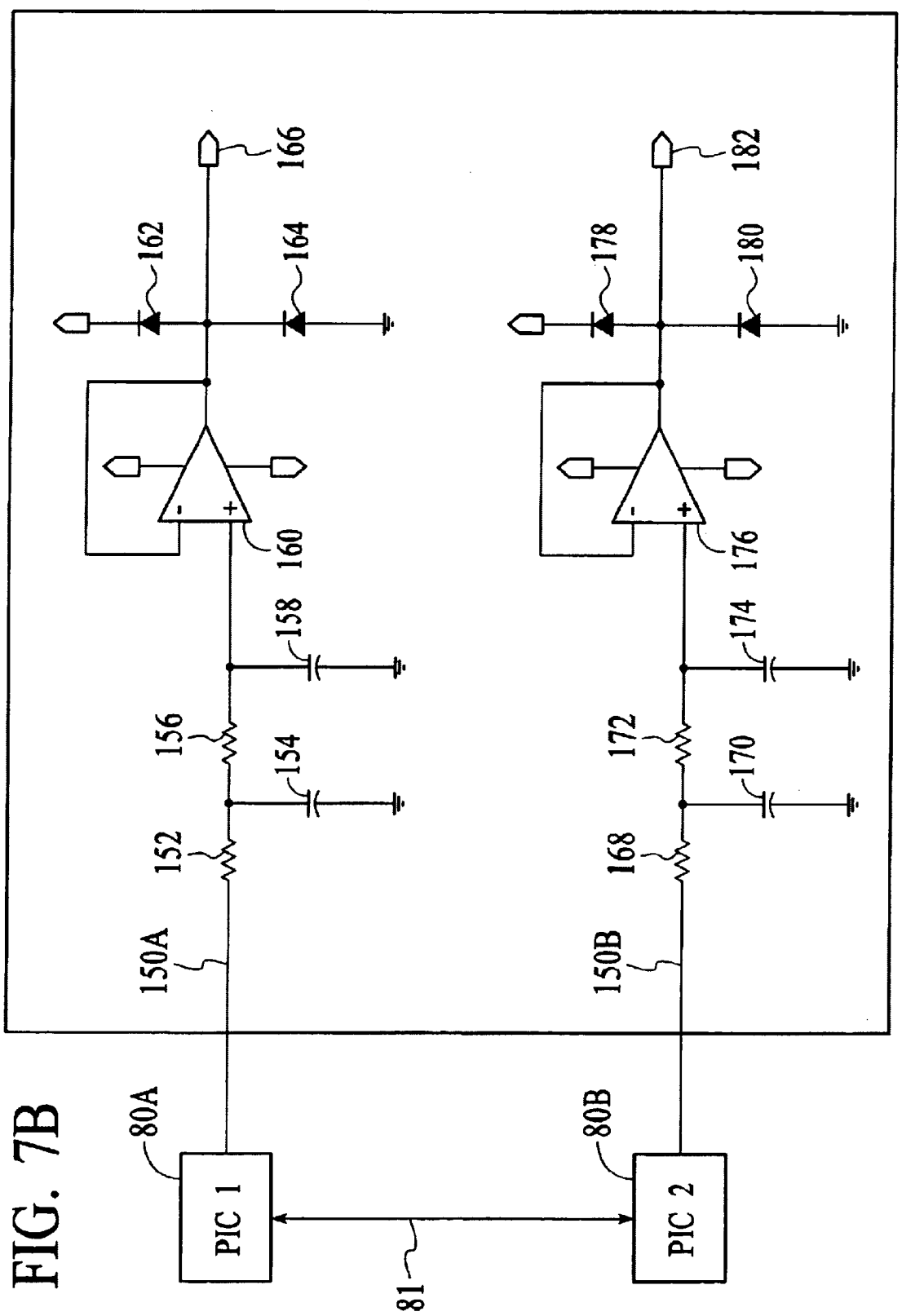
Figure 7C:
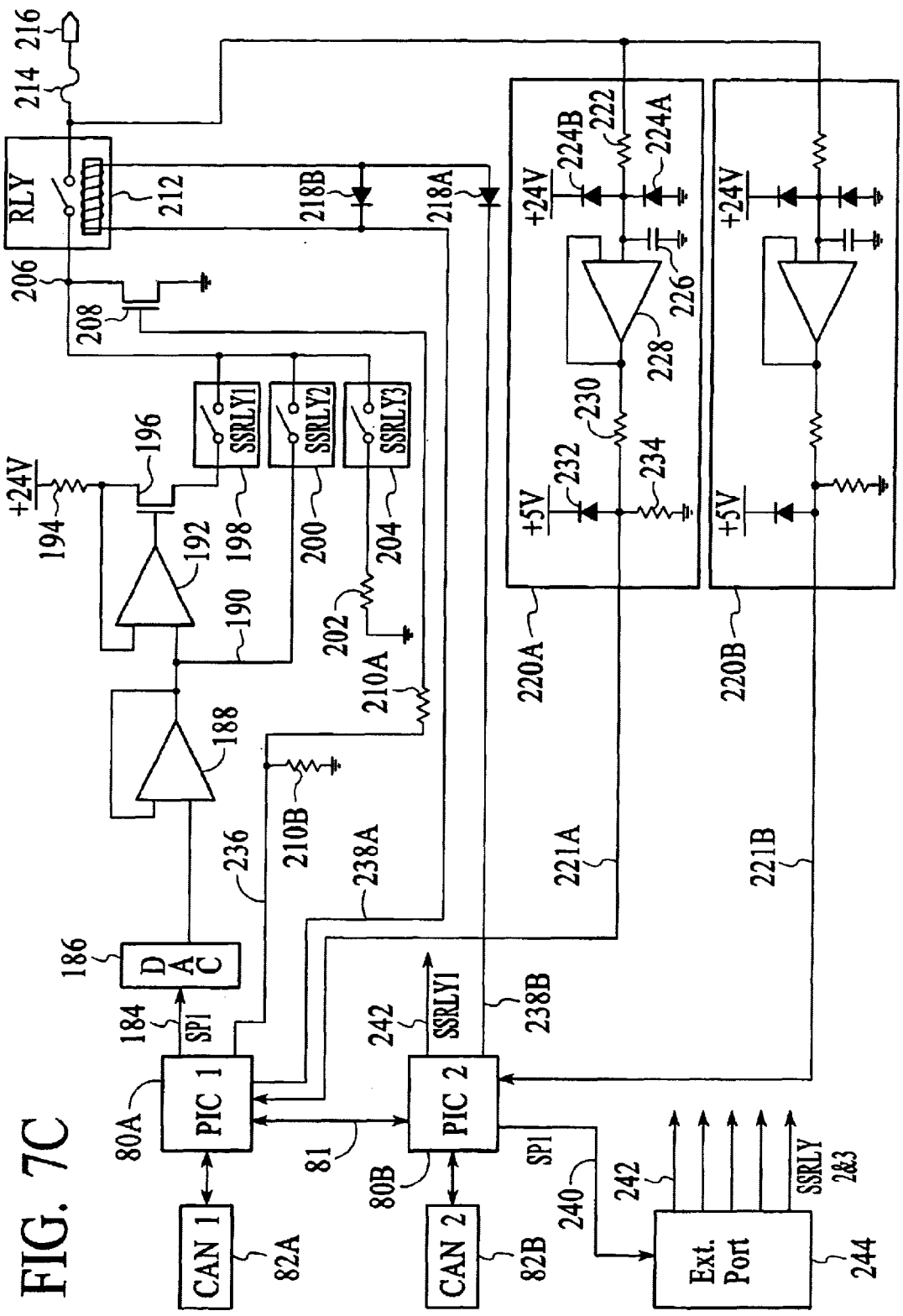

Referring now to FIGS. 7A to 7C, additional details of I/O modules in accordance with preferred embodiments of the present invention will now be described.

In accordance with the present invention, each I/O module includes a plurality of, in preferred embodiments two, slave controllers. In FIG. 7A, controllers 80A and 80B are illustrated, which are respectively coupled to controllers within main controller 24 via interfaces 82A and 82B, respectively. As previously explained, interfaces 82A and 82B are preferably serial interfaces in accordance with the CAN or I$^2$C protocols. What is important is that controllers 46A and 46B of main controller 24 have respective interfaces via which main controller 24 communicates with slave controllers 80A and 80B.

Slave controllers 80A and 80B are coupled to circuitry for providing inputs and outputs to the equipment or environment (e.g., I/O drivers 52A and 52B and combining circuitry 54 of FIG. 3). In the embodiment illustrated in FIG. 7A, 16 I/O terminals are provided per module (only one is illustrated in FIG. 7A). Each of the I/O terminals in the illustrated embodiment can be controlled to provide digital inputs, digital outputs or analog voltage inputs. In this embodiment, separate analog voltage outputs are provided, which will be discussed in connection with FIG. 7B. Referring again to FIG. 7A, slave controller 80A turns the output on or off in normal operation through line 84, which is coupled through a resistive network (resistors 86 and 88) to the control terminal of switch 90, which is preferably an FET (but could be another type of transistor or relay, etc.). One terminal of switch 90 is coupled to one terminal of relay 94, and the other terminal of switch 90 is coupled to ground, and line 84 may then control the line coupled to relay 94 to be either ground or logic high (pulled to the digital power supply level through resistor 89, which is optionally provided (in certain embodiments, the digital output is either ground or floating, with pull-ups located, as appropriate, in other parts of the system under control)). The opposite, output side, of relay 94 is coupled to I/O terminal 98 via fuse 96. Diodes 106 and 108 coupled to a positive voltage (e.g., 24 volts) and ground, respectively, as illustrated provide over-voltage protection to the I/O terminal line.

Slave controllers 80A and 80B, via lines 92 and 100 and diodes 102 and 104 cooperatively serve to control relay 94 thereby enabling interlock control of relay 94. Slave controllers 80A and 80B communicate with each other over bus 81, thereby providing an improved level of safety in that slave controllers 80A and 80B should provide consistent signals to lines 92 and 100 (i.e., high and low, respectively), in order for relay 94 to be energized to provide the output signal to terminal 98.

Analog voltage inputs, in the illustrated embodiment, are redundantly sensed by both of slave controllers 80A and 80B. The voltage on terminal 98 is coupled to analog MUX 122 (preferably via a low pass filter consisting of resistor 124 and capacitor 126) and to analog MUX 138 (preferably via a low pass filter consisting of resistor 142 and capacitor 140). Multiplexers 122 and 138 are optionally provided; in other embodiments, such multiplexers are not utilized, although the use of such multiplexers may desirably be utilized such as for purposes of reducing pin count, etc. The output of MUX 122 is coupled through resistor 120 to buffer amplifier 118, and through a resistive network (resistors 116 and 114, which are optionally provided to reduce the input voltage to the levels accepted by an on-board ADC within slave controller 80B) to buffer amplifier 112, which is coupled to an analog, ADC input of slave controller 80B. Similarly, the output of MUX 138 is coupled through resistor 136 to buffer amplifier 134, and through a resistive network (resistors 130 and 132) to buffer amplifier 128, which is coupled to an analog, ADC input of slave controller 80A. LED circuit 110 (preferably consisting of a resistor coupled to a positive supply and an LED) is coupled to a control terminal of slave controller 80B. A plurality of such diode circuits is provided in order to provide a desired number and type of LED indicators on a suitable face of the I/O module.

What is important to note from FIG. 7A is that a desired number of digital inputs/outputs and analog voltage inputs are provided to terminal 98 under control of slave controllers 80A and 80B, which, under control of the interlock controllers of the main controller, may provide redundant, interlock control to a plurality of terminals 98, with status or control information provided via a display preferably consisting of a plurality of LEDs or other display device.

Referring to FIG. 7B, an exemplary circuit for providing analog output voltages from the I/O module will now be described. The circuit of FIG. 7B may be provided in the same I/O module as the circuit of FIG. 7A, although the circuits are described separately for description purposes. In certain alternative embodiments, separate analog output voltage (and/or separate analog current inputs or outputs, etc.) may be provided in separate I/O modules. Referring again to FIG. 7B, slave controllers 80A and 80B communicate with each other over bus 81 (again, such as for synchronization or redundancy purposes, etc.). Slave controller 80A provides a pulse width modulated (PWM) output on line 150A, which is coupled through a (preferably multistage, low pass) filter network (consisting of resistor 152, capacitor 154, resistor 156 and capacitor 158) to buffer amplifier 160. The output of buffer amplifier 160 is coupled to output terminal 166. Diodes 162 and 164 are coupled to a positive supply and ground, respectively, to provide an over-voltage protection to output terminal 166.

Analog voltages are similarly provided under control of slave controller 80B via PWM output 150B, resistor 168, capacitor 170, resistor 172, capacitor 174, buffer amplifier 176, and diodes 178 and 180 to terminal 182. It should be noted that the desired number of analog voltages are provided in the I/O module as desired for the particular application (e.g., six, sixteen, or other number, etc.); in the illustrated embodiments, such analog voltage outputs are not interlocked, although in other embodiments such analog output voltages also may be interlocked.

FIG. 7C illustrates an alternative embodiment of I/O module 26. As with the previously described embodiments, slave controllers 80A and 80B are provided with interfaces 82A and 82B, respectively, provided for communications with the corresponding interlock controllers of the main controller, and bus 81 optionally is provided for communications between slave controllers 80A and 80B. Slave controller 80A provides an output on line 184 (preferably an SPI serial connection) to DAC 186, which preferably provides an output to buffer amplifier 188. Buffer amplifier 188 may be configured, for example, to provide a 0 to 5 volt to 0 to 10 volt conversion in order to provide a desired analog output voltage range. The output of buffer amplifier 188 is coupled to an input of buffer amplifier 192 and via line 190 to an input of relay 200 (preferably a solid state relay). The output of buffer amplifier 192 is coupled to a control terminal of FET/switch 196; one terminal of FET/switch 196 is coupled to a positive supply terminal through resistor 194, and the other terminal of FET/switch 196 is coupled to an input of relay 198, all as illustrated. An input of relay 204 is coupled to ground through resistor 202. The outputs of relays 198 (providing a controllable current source output), 200 (providing a controllable voltage source output) and 204 (providing a switchable resistance in order to provide a current to voltage conversion for input current sensing) (all of relays 198, 200 and 204 preferably are solid state relays) are coupled together at node 206. Node 206 may be coupled to ground potential via switch/FET 208, which is controlled by slave controller 80A through the signal on line 236 via resistors 210B and 210A. While not expressly shown, a pull-up resistor may also be coupled to node 206, such as resistor 89 of FIG. 7A.

Node 206 is coupled to terminal 216 via relay 212 and fuse 214. Relay 212 is cooperatively controlled by slave controllers 80A and 80B via lines 238A and 238B and diodes 218A and 218B. Relay 212 under control of slave controllers 80A and 80B desirably may serve as the main interlock control relay for I/O modules 26 in accordance with this embodiment. The output node of relay 212, in addition to being coupled to fuse 214, is coupled to input voltage circuits 220A and 220B. Input voltage circuit 220A will be described, it being understood that input voltage circuit 220B preferably is constructed and operates in an analogous manner.

The voltage on the output node of relay 212 is coupled to one terminal of resistor 222, the other terminal of which is coupled to buffer amplifier 228. Diode 224A is coupled to ground potential, and diode 224B is coupled to a positive potential as illustrated in order to provide over-voltage protection. Resistor 222 and capacitor 226 serve to provide a low pass filter operation on the signal input to buffer amplifier 228. The output of buffer amplifier 228 is coupled through resistor 230 to one terminal of resistor 234, the other terminal of which is coupled to ground. Diode 232 is coupled to a positive potential as illustrated to provide over-voltage protection. Line 221A is coupled from resistor 234 to an ADC input node of slave controller 80A. A potential on the output node of relay 212 may thus be sensed through buffer amplifier 228 (and the other components of input voltage circuit 220A) by slave controller 80A. Slave controller 80B may similarly sense the voltage on the output node of relay 212 through input voltage circuit 220B and an ADC input node of slave controller 80B on line 221 B.

Slave controller 80B preferably includes output 242 for controlling relay 198 and output 240 for controlling relays 200 and 204. In embodiments where the I/O ports or pins of slave controller 80B may be fully utilized, such control for relays 200 and 204 may be provided by way of external port 244, which has a plurality of outputs 242 for providing such relay control. Slave controller 80B preferably provides relay control commands to external port 244 via a serial connection, again for purposes of utilizing fewer output pins, etc.

As constituted in the foregoing manner, I/O modules in accordance with the embodiment of FIG. 7C may provide a large number of inputs and outputs for controlling equipment, processing lines or other environments. Again, while I/O module 26 of FIG. 7C illustrates only a single output terminal, it is understood that I/O modules typically will have a much greater number, such as 16, 32, etc., per I/O module. Embodiments such as is illustrated in FIG. 7C may thus provide a large number of control inputs and outputs, each of which may be programmably controlled to be a digital input or output, or an analog voltage input or output, or an analog current input or output. Surprisingly, such a highly versatile I/O module/main controller arrangement may provide a level of redundant, interlocked control, with each module I/O having the capability to input or output signals of varying types.

To summarize the operational aspects of the I/O module of FIG. 7C, additional description will be provided.

To provide a digital output, relays 198, 200 and 204 are controlled to be off. Switch/FET 208 is controlled on and off to provide the digital output (this output may be ground/floating, or a pull-up resistance may be provided to provide a positive digital potential for the digital high level). Relay 212 provides interlock control, which is backed up by switch/FET 208. Fuse 214 provides additional safety.

To provide a digital input, relay 212 is controlled off. Digital inputs may be sensed through input voltage circuits 220A and 220B by slave controllers 80A and 80B at any time.

To provide an analog voltage output, relay 212 is controlled on. Relay 200 is controlled on. Relays 198 and 204 are controlled off. Analog voltage output may be controllably provided by slave controller 80A via DAC 186 (preferably through buffer amplifier 188).

To provide an analog input voltage, relay 212 is controlled off. The analog voltage may be input and sensed through input voltage circuits 220A and 220B at any time by slave controller 80A and/or 80B. In preferred embodiments, the input voltage may be sensed, for example, over a range of 0 to 24 volts (or other suitable desired range).

To provide an analog current output, relay 212 is controlled on. Relay 198 is controlled on, and relays 200 and 204 are controlled off. Slave controller 80A via DAC 186 provides an analog voltage to drive the current source (preferably FET 196 via buffer amplifiers 188 and 192). In preferred embodiments, the output current is controlled to be from 0 to 20 milliamperes or 4–20 milliamperes or other suitable desired range.

To provide an analog current input, relay 212 is controlled on. Relay 204 is controlled on. Relays 198 and 200 are controlled off. The input current flows through resistor 202 (via relay 212 and relay 204), and the voltage drop across resistor 202 is sensed by slave controller 80A and/or 80B via input voltage circuits 220A and/or 220B.

Figure 8:
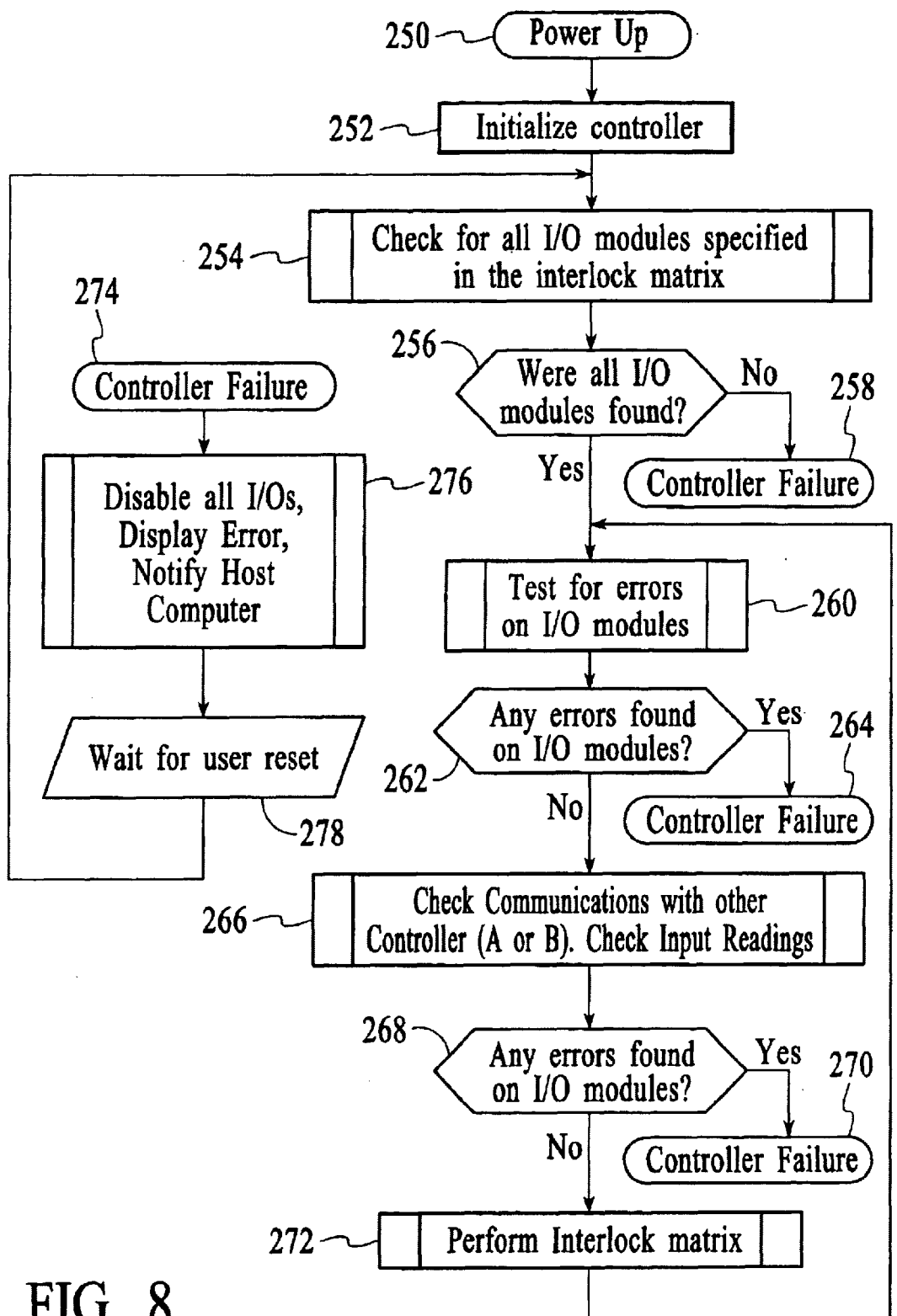
FIG. 8 is a flow chart illustrating an exemplary flow applicable to certain preferred embodiments of the present invention.

Referring now to FIG. 8, an illustrative flow description of how embodiments of the present invention may desirably provide control to equipment, processing lines, or other environments, and how methods of manufacturing articles (such as semiconductors, displays, etc.) may be produced in accordance with such a control algorithm and method.

At step 250, the equipment (or processing line or other environment, etc.) is powered up. At step 252, typically after an interval of time sufficient for the power to stabilize throughout the system, the controller is initialized. Any boot-up or other power-up sequence or diagnostics are performed, interlock or other control matrices may be accessed and initialized in software so that the desired control algorithm programmed into the system may be implemented. In accordance with the preferred embodiments of the present invention, the initial sequence will define the inputs and outputs and their voltage type, etc., as previously described. At step 254, the control algorithm commences and a check is made for all I/O modules specified in the interlock matrix. With intelligent I/O modules in accordance with the present invention, at step 254 the I/O modules may be polled to ensure that they are responding properly, as specified in the interlock matrix or other control table or the like. At step 256, a determination is made if all I/O modules were found that were expected to be found. If no, at step 258 a controller failure is triggered. If yes, the process proceeds to step 260.

At step 260, a test preferably is performed in order to detect errors on the I/O modules. As an illustrative example, the I/O modules may again be polled, the I/O modules may be programmed to report back to the main controller that "all is ok." At step 262, a determination is made as to whether errors were detected. If yes, at step 264 a controller failure is triggered. If no, the process proceeds to step 266. At step 266, a check is made of communications between the two interlock controllers and/or the two slave controllers. For example, input voltage sensing nodes of two slave controllers could be cross checked to see if they are sensing the same voltage. Alternatively, the controllers may simply exchange commands or other communications to confirm that they are operating acceptably and consistently. With intelligent and dual I/O processing as in the present invention, a variety of checks may be performed to ensure that the control system is operating reliably and in accordance with the interlock matrices and/or other control table or algorithm. At step 268, a determination is made as to whether any errors were detected. If yes, at step 270 a controller failure is triggered. If no, the process proceeds to step 272, at which time the interlock matrix is performed. At this step, all inputs are sensed, and the appropriate outputs are generated or not generated, etc., as dictated by the interlock matrices or other control table or algorithm. At this step, the various sequences and operations are performed such as for performing processing to manufacture articles, control a processing line, etc. The process may then loop back to step 260.

At step 274, a controller failure routine is performed. Once detected, at step 276 all I/Os are disabled, error messages are displayed (such as through a display on a host computer, the main controller, and/or LEDs or other displays on the I/O modules). In preferred embodiments, a combination of the foregoing is displayed to more readily enable a technician to determine the location and cause of the error. At step 278, the control system enters a wait or hold state, awaiting system reset.

As will appreciated, in accordance with the present invention, equipment and processing lines or other environments may be desirably controlled with a redundant, distributed, interlockable control system and method, thereby providing numerous advantages such as are described herein.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. An apparatus for controlling a system, wherein the system operates responsive to a plurality of input control signals, wherein during operation the system generates a plurality of output status/control signals, comprising:

a master controller having at least first and second controllers, wherein the first controller outputs and inputs signals over a first communication path, wherein the second controller outputs and inputs signals over a second communication path, wherein the first and second controllers output signals based on input signals received over the first and second communication paths, respectively, and also based on stored control data;

a plurality of input/output modules, wherein each of the input/output modules comprises first and second slave controllers, wherein the first slave controller of each of the input/output modules inputs and outputs signals over the first communication path to the first controller, wherein the second slave controller outputs and inputs signals over the second communication path, wherein each of the first slave controllers outputs and inputs signals to and from a first input/output circuit, wherein each of the second slave controllers outputs and inputs signals to and from a second input/output circuit, wherein each of the input/output modules further comprises a combiner circuit, wherein at least some of the input control signals for controlling the system are generated by the combiner circuit of each input/output module based on signals output from both the first and second input/output circuits;

wherein the output control signals for controlling the system are generated based on output status/control signals from the system that are coupled to each of the first and second input/output circuits of the input/output modules.

2. The apparatus of claim 1, wherein the first and second controllers comprise interlock controllers.

3. The apparatus of claim 2, wherein the stored control data comprises interlock control data.

4. The apparatus of claim 3, wherein the first and second interlock controllers control the generation of interlock control signals to the system based on control/status control signals received from the system.

5. The apparatus of claim 1, wherein each of the input/output circuits comprises a predetermined number of input/output nodes, wherein the input/output nodes are programmed to be either inputs or outputs.

6. The apparatus of claim 5, wherein the input/output nodes are programmed to be either analog or digital inputs or outputs.

7. The apparatus of claim 6, wherein the input/output nodes are programmed based on signals sent from the first and second controllers to the first and second slave controllers, respectively, of each of the input/output modules.

8. The apparatus of claim 7, wherein the input control signals for controlling the system comprise redundant interlocked control signals.

9. The apparatus of claim 8, wherein the input control signals for controlling the system are generated by the combiner circuits of the input/output modules in a manner that at least certain input control signals are generated only if signals from the first and second output circuits correspond to a condition that the certain input control signals should be generated.

10. The apparatus of claim 9, wherein the signals from the first and second output circuits are logically ANDed to determined if the certain input control signals should be generated.

11. The apparatus of claim 1, wherein the plurality of input/output modules are physically located at a plurality of different locations in the system.

12. The apparatus of claim 11, wherein the first and second communication paths are coupled to the plurality of input/output modules at the plurality of different locations.

13. The apparatus of claim 12, wherein the first and second communication paths comprise serial communication paths.

14. The apparatus of claim 1, wherein the first and second controllers are coupled together through a third communication path.

15. The apparatus of claim 14, wherein the first and second controllers perform redundancy checking based on signals exchanged over the third communication path.

16. The apparatus of claim 1, wherein the first and second controllers operate responsive to commands received from a host computer over a fourth communication path.

17. The apparatus of claim 16, wherein the fourth communication path comprises a serial communication path.

18. A method for controlling a system, wherein the system operates responsive to a plurality of input control signals, wherein during operation the system generates a plurality of output status/control signals, comprising:

outputting and inputting signals over a first communication path of a first controller of a master controller, wherein the master controller has at least first and second controllers, and outputting and inputting signals over a second communication path of the second controller, wherein the first and second controllers output signals based on input signals received over the first and second communication paths, respectively, and also based on stored control data;

inputting and outputting signals with a plurality of input/output modules, wherein each of the input/output modules comprises first and second slave controllers, wherein the first slave controller of each of the input/output modules inputs and outputs signals over the first communication path to the first controller, wherein the second slave controller outputs and inputs signals over the second communication path, wherein each of the first slave controllers outputs and inputs signals to and from a first input/output circuit, wherein each of the second slave controllers outputs and inputs signals to and from a second input/output circuit, wherein each of the input/output modules further comprises a combiner circuit, wherein at least some of the input control signals for controlling the system are generated by the combiner circuit of each input/output module based on signals output from both the first and second input/output circuits;

wherein the output control signals for controlling the system are generated based on output status/control signals from the system that are coupled to each of the first and second input/output circuits of the input/output modules.

19. The method of claim 18, further comprising the step of operating an industrial process, wherein the industrial process is controlled based on the signals input to and output from the input/output modules.

20. The method of claim 18, further comprising the step of controlling a semiconductor manufacturing apparatus, wherein the semiconductor manufacturing apparatus is controlled based on the signals input to and output from the input/output modules.

* * * * *